United States Patent
Monk

(10) Patent No.: US 9,262,762 B2
(45) Date of Patent: Feb. 16, 2016

(54) SYSTEM AND METHOD FOR PROCESSING FEES FOR A CARD

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 1515 days.

(21) Appl. No.: 12/248,127

(22) Filed: Oct. 9, 2008

(65) Prior Publication Data

US 2010/0036758 A1 Feb. 11, 2010

Related U.S. Application Data

(63) Continuation-in-part of application No. 11/757,914, filed on Jun. 4, 2007, now Pat. No. 8,146,806.

(60) Provisional application No. 61/083,482, filed on Jul. 24, 2008.

(51) Int. Cl.
*G06Q 20/40* (2012.01)
*G06Q 20/32* (2012.01)
*G06Q 20/10* (2012.01)
(Continued)

(52) U.S. Cl.
CPC ........ *G06Q 20/40145* (2013.01); *G06Q 20/105* (2013.01); *G06Q 20/322* (2013.01); *G06Q 20/3278* (2013.01); *G06Q 20/40* (2013.01); *G06Q 20/4016* (2013.01); *G06Q 30/06* (2013.01); *G06Q 40/02* (2013.01); *G06Q 40/12* (2013.01)

(58) Field of Classification Search
CPC ... G06Q 20/204; G06Q 20/20; G06Q 20/202; G06Q 20/322; G06Q 20/40
USPC .......................................................... 705/17
See application file for complete search history.

(56) References Cited

U.S. PATENT DOCUMENTS

2002/0095303 A1 7/2002 Asayama et al.
2002/0194137 A1 12/2002 Park et al.
(Continued)

FOREIGN PATENT DOCUMENTS

JP 2007-148555 6/2007
KR 10-2000-0063246 11/2000
(Continued)

OTHER PUBLICATIONS

Keating, Bryan. Essays in Industrial Organization: Switching Costs in an Evolving Industry Price Structure in Two-Sided Markets. Jun. 2007.*

(Continued)

*Primary Examiner* — Ryan Zeender
*Assistant Examiner* — Fawaad Haider
(74) *Attorney, Agent, or Firm* — Kilpatrick Townsend & Stockton

(57) ABSTRACT

A processing system is operable for issuance and processing of cards with fee options applicable to a group of fee types. In one embodiment, the processing system includes a processing module, a secure card network, an issuer fee database and card account database. The card issuance database is operable to store a fee record associated with a card, wherein the fee record includes the fee options configured to apply to the group of fee types. The card account database is operable to store a card account record for the card, wherein the card account record includes a universal fee access counter for tracking parameters associated with the fee options configured to apply to the group of fee types.

24 Claims, 7 Drawing Sheets

(51) Int. Cl.
*G06Q 30/06* (2012.01)
*G06Q 40/02* (2012.01)
*G06Q 40/00* (2012.01)

(56) References Cited

U.S. PATENT DOCUMENTS

| | | |
|---|---|---|
| 2003/0004878 A1 | 1/2003 | Akutsu |
| 2003/0078877 A1* | 4/2003 | Beirne et al. ............... 705/38 |
| 2003/0163426 A1 | 8/2003 | Zhang et al. |
| 2004/0059634 A1* | 3/2004 | Tami et al. ................. 705/17 |
| 2006/0277111 A1* | 12/2006 | Bevis ........................... 705/26 |
| 2007/0199986 A1 | 8/2007 | Walsh et al. |
| 2010/0070359 A1 | 3/2010 | Heasley et al. |
| 2010/0145818 A1 | 6/2010 | Udiani |
| 2011/0029431 A1 | 2/2011 | Knapp |
| 2011/0082792 A1 | 4/2011 | Ballard et al. |

FOREIGN PATENT DOCUMENTS

| | | |
|---|---|---|
| WO | 96/36934 A1 | 11/1996 |
| WO | 01/86569 A1 | 11/2001 |

OTHER PUBLICATIONS

Office Action mailed Jul. 29, 2011 in related U.S. Appl. No. 11/757,914, 14 pages.
Examination Report, dated Dec. 17, 2013, in Russian Application No. 2011106784; 9 pages.

* cited by examiner

SYSTEM AND METHOD FOR PROCESSING FEES FOR A CARD

CROSS-REFERENCE TO RELATED APPLICATIONS

The present U.S. Utility Patent Application claims priority pursuant to 35 U.S.C. §119(e) to U.S. Provisional Application Ser. No. 61/083,482 entitled "System and Method for Processing Fees for a Card,", filed Jul. 24, 2008, which is hereby incorporated herein by reference in its entirety and made part of the present U.S. Utility Patent Application for all purposes.

The present U.S. Utility Patent Application claims priority pursuant to 35 U.S.C. §120 as a continuation-in-part (CIP) application to U.S. patent application Ser. No. 11/757,914 entitled "Prepaid Negative Balance Fee Processing and Fee Diversion,", filed Jun. 4, 2007, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to processing systems for issuance of cards and processing of card transactions and more particularly to transaction fees in such processing systems.

2. Description of Related Art

A processing system typically includes processing modules and secure communications networks for card processing, such as issuance and activation of cards, authorization and processing of card transactions and clearance and settlement of card transactions. The processing system communicates with issuers, such as bank or other entities, to issue cards to cardholders. The processing system then coordinates activation of cards and creation of card accounts for cardholders in its databases. The processing system also processes electronic transactions for the card accounts and determines transaction fees depending on the type of transaction. For example, various transaction fees may be charged to the card accounts depending on the type of transaction, such as withdrawing money from an ATM, Point of Sale (POS) purchases, ATM balance inquiries, etc. During clearance and settlement of electronic transactions, the processing system transmits the transaction amounts and transaction fees to the associated issuers for card accounts and remits payments of transaction amounts received from the issuers to acquirer banks for the merchants.

During the issuance process, an issuer first selects a type of card, such as credit, debit and prepaid cards, for issuance. The processing system communicates certain card features and services that the issuer may configure for the type of card selected by the issuer. One of the current features offered by processing systems during card issuance is an option for the issuer to select fee options for a unique fee type, wherein fee type may include fees associated with a transaction or fees associated with maintenance or service of a card. The processing system also provides an option for an issuer to select a unique fee type and waive any fees for a selected number of that unique fee type for the issued card. The option may provide for the waiver of fees to be reset periodically. For example, the selected fee options may provide for waiver of a number of fee types that resets each month providing for a number of free transactions each month for that unique fee type.

During processing of card transactions, the processing system tracks the number of that unique fee type processed for the card account associated with the issued card. If the number of that unique fee type is below the number selected by the issuer for the selected period, then the fee for that unique fee type is not charged to the card account by the processing system. However, once the selected number of that unique fee type has been exceeded for a selected period, the processing system then charges the associated fee for that fee type to the card account.

The current processing systems lack flexibility in the fee options provided to an issuer during issuance of a card, especially with respect to fee options that may be applicable to more than one fee type. Therefore, a need exists for a more flexible processing system that is operable to provide different options for waiver and/or selection of fees for groups of fee types

BRIEF DESCRIPTION OF THE SEVERAL VIEWS OF THE DRAWING(S)

DETAILED DESCRIPTION OF THE INVENTION

Figure 1:
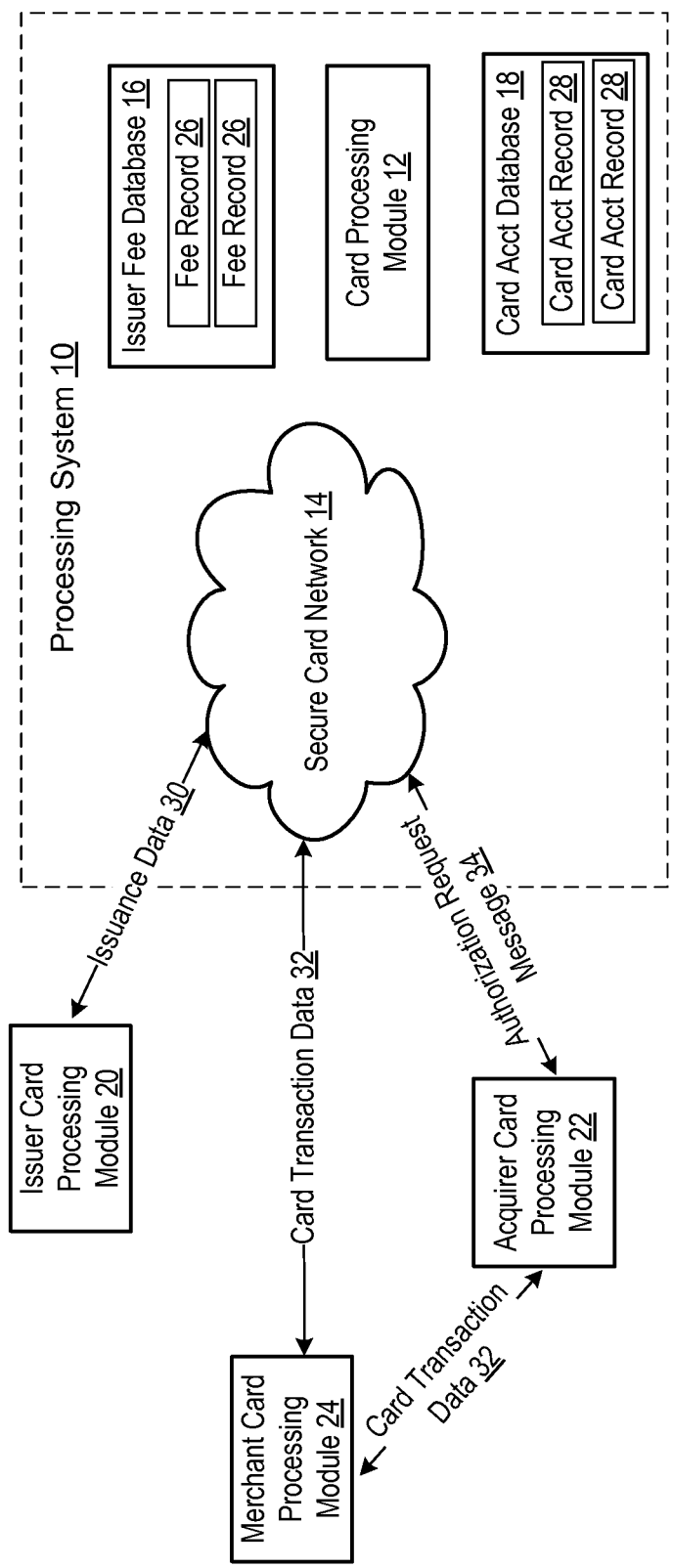
FIG. 1 is a schematic block diagram of an embodiment of a processing system in accordance with the present invention.

FIG. 1 is a schematic block diagram of an embodiment of a processing system 10 operable to support issuance of cards with fee options configured to apply to a group of fee types and processing of such cards with fee options applicable to a group of fee types. The processing system 10 includes a processing module 12, a secure card network 14, an issuer fee database 16 and card account database 18.

Figure 3:
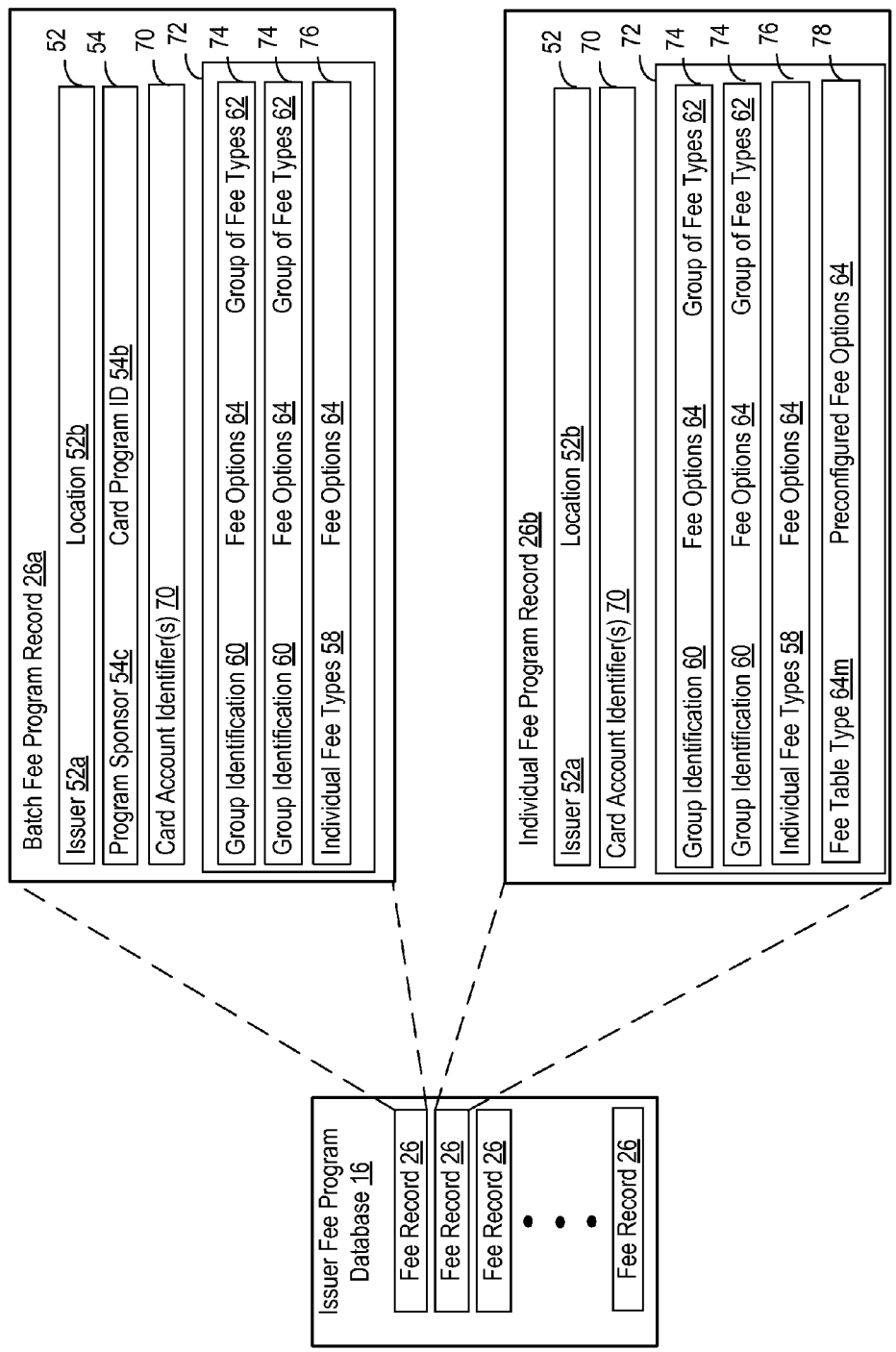
FIG. 3 is a schematic block diagram of an embodiment of a card account database in a processing system in accordance with the present invention.

The issuer fee database 16 includes one or more fee records 26 for storing fee types and fee options selected by an issuer for a card 36 or a batch of cards 36, as shown in more detail in FIG. 3. A card 36 may include a credit card, debit card, charge card, stored-value card, prepaid card, Electronic Benefit Transfer card, card account and other types of issued cards or accounts, in any type of physical or electronic form, including a plastic card, smart card, microchip, wireless device, electronic fund account, etc.

Figure 4:
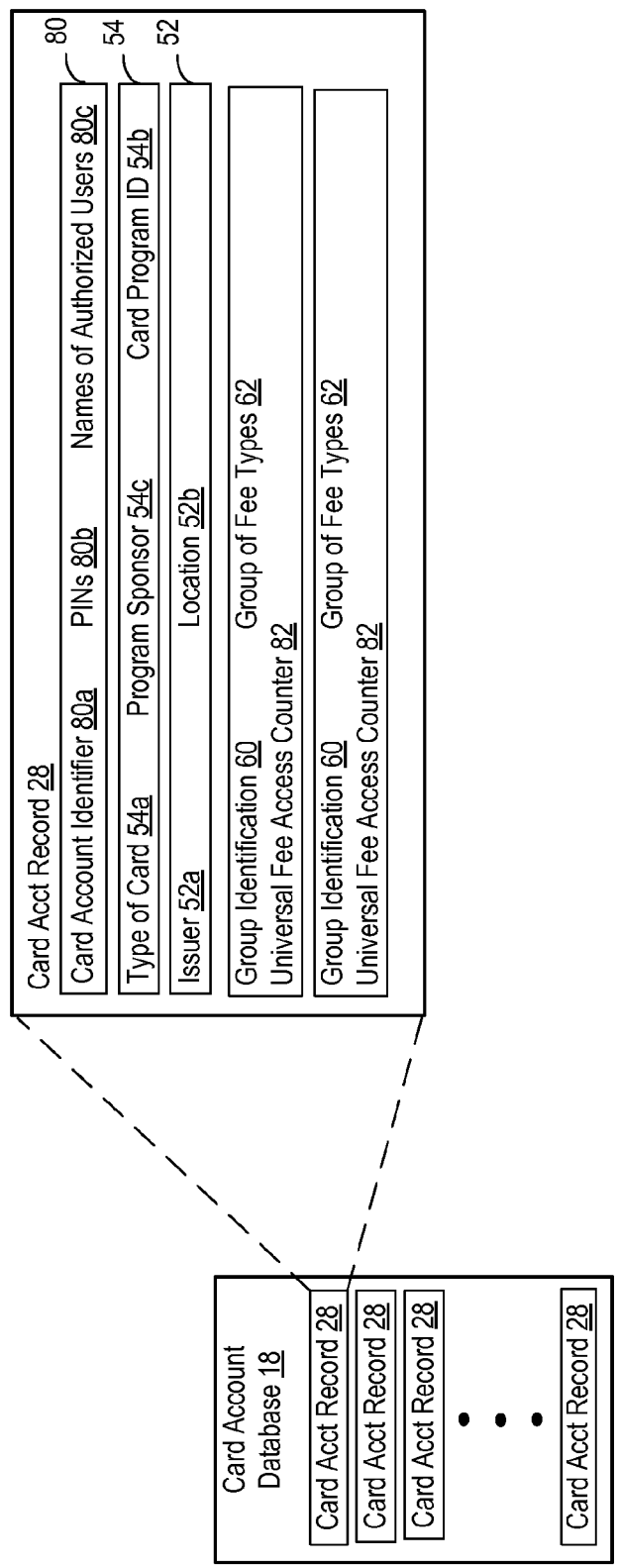
FIG. 4 is a schematic block diagram of an embodiment of a method for issuance of cards in accordance with the present invention.

The card account database 18 is operable to store and manage card account records 28 that include cardholder data, as shown in more detail in FIG. 4. The issuer fee database 16 and card account database 18 may be implemented as one database or as multiple databases and may be implemented by one or more servers, storage area networks, network attached storage devices, or other storage systems located in one geographical location or multiple geographical locations. The issuer fee database 16 and card account database 18 may be structured as relational, network, hierarchal or object based or other type of structured databases.

The secure card network 14 may include one or more interconnected networks, having network nodes such as network interface cards (NICs), bridges, hubs, switches or routers that are managed by one or more network management systems to provide secure channels of communication. In one embodiment, the secure card network 14 is VisaNet or a similar proprietary network.

The processing system 10 is operable to communicate with an issuer card processing module 20 through the secure card network 14 and/or through other financial or third party networks. An issuer includes but is not limited to a bank or other financial institution operable to issue a card 36 or batch of cards 36 to one or more cardholders. The issuer card processing module 20 communicates issuance data 30 selected by the issuer for a cardholder to the processing system 10. A cardholder includes but is not limited to an individual or entity issued a card 36 or batch of cards 36 or authorized to use a card 36 or an account holder of the issuer. The issuance data 30 includes data about the cardholder, issuer and data about fee options and fee types as described below and any other information supported by the processing system 10.

The processing system 10 is also operable to communicate with an acquirer card processing module 22 through the secure card network 14 and/or through other financial or third party networks. The term "acquirer" includes but is not limited to the merchant's payment processor, the merchant's bank or financial institution who acquires transactions from merchants and routes messages, authorizations or clearing drafts between merchants and the processing system 10. The processing system 10 is also operable to communicate to the merchant card processing module 24 through the acquirer card processing module 22. In another embodiment, the merchant card processing module 24 may communicate to the processing system 10 through the secure card network 14 and/or through a merchant network or other financial or third party networks without first communicating through the acquirer card processing module 22. In both embodiments, card transaction data 32 is received by the processing system 10. Transaction data 32 may include, inter alia, a transaction data, such as transaction type, a transaction amount, a merchant name and/or identifier, card data and any other associated transactional information.

Each of the processing modules, including card processing module 12, issuer card processing module 20, acquirer card processing module 22 and merchant card processing module 24, may be a single processing device or a plurality of processing devices in a network. Such processing devices may include one or more network nodes, including routers, bridges, servers, personal computer, etc., wherein each processing device may include a microprocessor, micro-controller, digital signal processor, microcomputer, central processing unit, graphics cards, field programmable gate array, programmable logic device, state machine, logic circuitry, analog circuitry, digital circuitry, and/or any device that manipulates data and/or signals (analog and/or digital) based on hard coding of the circuitry and/or operational instructions. One or more of the processing devices may have an associated memory element, which may be a single memory device, an external memory, plurality of memory devices, network attached storage, storage area network and/or embedded circuitry in the processing module. Such memory may be a read-only memory, random access memory, volatile memory, non-volatile memory, static memory, dynamic memory, flash memory, cache memory, and/or any device that stores digital information. Note that when a processing device implements one or more of its functions via a state machine, analog circuitry, digital circuitry, and/or logic circuitry, the memory element storing the corresponding operational instructions may be embedded within, or external to, the processing device comprising the state machine, analog circuitry, digital circuitry, and/or logic circuitry. Further note that, the memory element stores, and the processing device executes, hard coded and/or operational instructions corresponding to at least some of the steps and/or functions described for the processing modules in this specification and illustrated in FIGS. 1-7. The processing devices may also include other components, including displays, keyboards, speakers, microphones and other user interfaces.

The card processing module 12 is operable to support an option for the issuer to select fee options for fee types, wherein a fee type may include fees associated with a transaction or fees associated with membership, maintenance or service of a card or other types of fees. Exemplary fee types are listed below however other fee types not shown below may also be included. In one embodiment, each fee type is identified by a unique fee identification code. An example fee identification code is shown below with each exemplary fee type.

| Fee Identification Code | Fee Type |
| --- | --- |
| 1017 | VRU Access |
| 1018 | CSR Access |
| 1021 | ATM Balance Inquiry - Domestic |
| 1022 | ATM Withdrawal - Domestic |
| 1023 | Teller Cash - Domestic |
| 1024 | Purchase w/Cash Back - Domestic |
| 1025 | Signature Quasi Cash - Domestic |
| 1028 | PIN pas Purchase Domestic |
| 1029 | PIN Quasi Cash Domestic |
| 1030 | Signature pas Purchase Domestic |
| 1032 | ATM Withdrawal International |
| 1033 | Teller Cash International |
| 1034 | Purchase w/Cash Back International |
| 1035 | Signature Quasi Cash International |
| 1036 | PIN pas Purchase International |
| 1037 | PIN Quasi Cash International |
| 1038 | Signature pas Purchase International |
| 1041 | PIN pas Decline Domestic |
| 1042 | PIN pas Decline International |
| 1043 | Signature pas Decline Domestic |
| 1044 | Signature pas Decline International |
| XXXX | ACH funds transfer |
| XXXX | ATM Balance Inquiry Domestic On-Us |
| XXXX | ATM Withdrawal Domestic On-Us |
| XXXX | ATM Mini Statement Domestic On-Us |
| XXXX | ATM Decline Domestic On-Us |
| XXXX | ATM Balance Inquiry Domestic Not On-Us |
| XXXX | ATM Withdrawal Domestic Not On-Us |
| XXXX | ATM Mini Statement Domestic Not On-Us |
| XXXX | ATM Decline Domestic Not On-Us |

For each fee type, the processing system supports various fee options. During the issuance process of a card 36 or batch of cards 36 in current processing systems, the processing system is only operable for selection of one fee identification code and selection of fee options for the associated unique fee type. For example, an issuer may only select one fee identification code such as "1022" for fee type "ATM Withdrawal—Domestic" and then select fee options for that unique fee type. The fee options must be selected on a fee type by fee type basis.

In an embodiment of the present invention, the processing system 10 is operable to support selection of two or more fee types that form a group of fee types and configure fee options that are applicable to the selected group of fee types. For example, an issuer may select two or more fee identification codes to create a group of fee types and then configure or select fee options applicable to that group of fee types.

Figure 2:
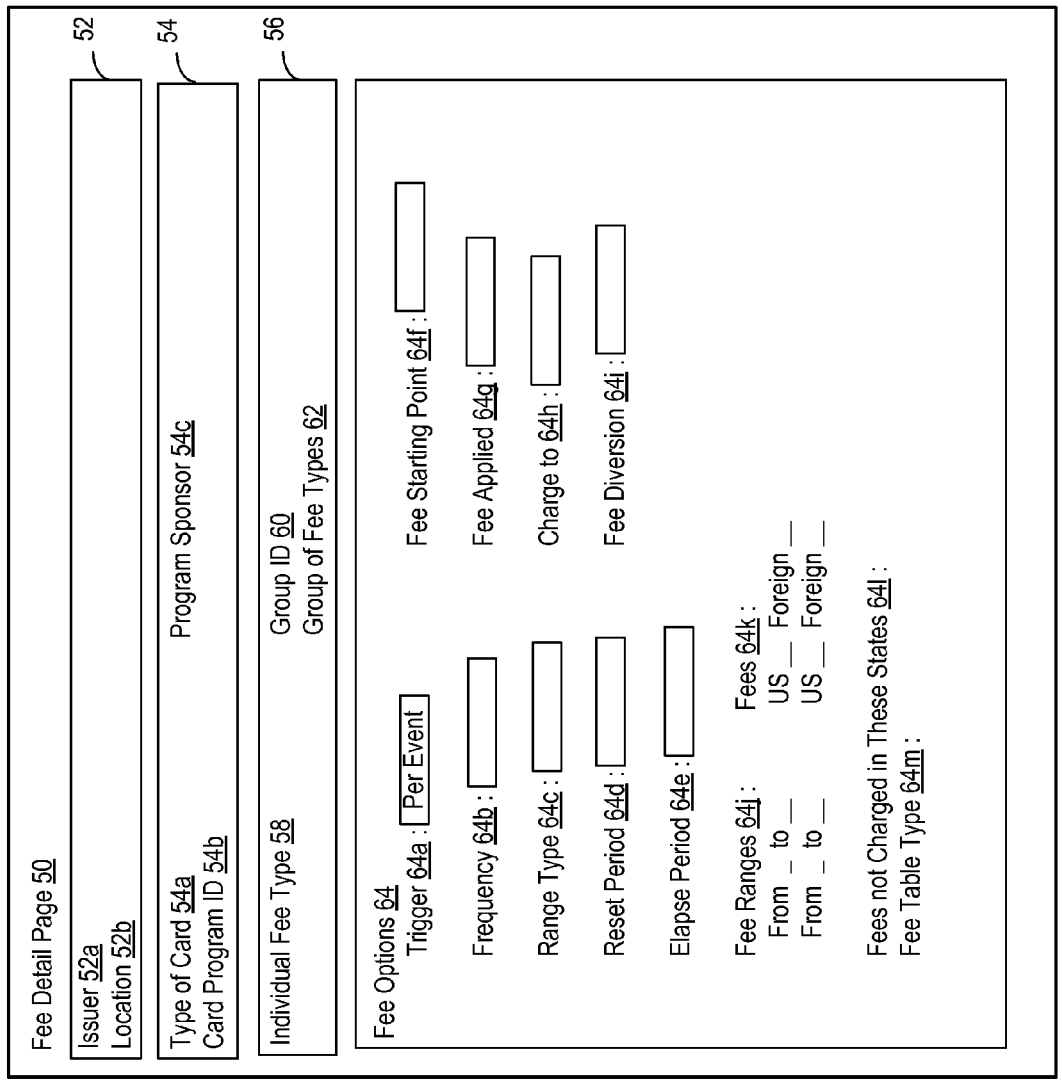
FIG. 2 is a schematic block diagram of an embodiment of a graphical user interface implemented by a processing system for issuance of cards in accordance with the present invention.

Referring to FIG. 2, an exemplary graphical user interface of a fee detail page 50 is shown that may be displayed on the issuer card processing module 20. In other embodiments, the fee detail page 50 may have different arrangements, fields, data selections or multiple pages or various toolbars or drop-downs. The fee detail page includes fields for issuer identification data 52 and card data 54. The issuer identification fields include issuer name 52a, location 52b and any other information that may identify the issuer. Card data 54 includes fields such as the type of card 54a, card program identification and program sponsor for a batch of cards 54b, etc. Cardholder data may also be collected, such as card account, authorized user identifications, addresses, pins, etc., if available. Certain cardholder data, such as pin numbers, may not be available or not collected until authorization of a card 36, especially if a batch of cards 36 is to be issued to a program sponsor for later distribution to the cardholders.

The fee detail page 50 also includes fee type identification portion 56. The fee type identification portion may identify only a single or unique fee type 58. If a unique fee type is identified, then the fee options will only apply to that unique fee type. Preconfigured fee data may also be set for each unique fee type unless altered or changed on a fee detail page 50 by an issuer. The fee type identification portion also includes a group identification 60 and group of fee types 62. The group of fee types 62 includes at least two unique fee types.

The fee detail page 50 also includes fee options 64. Exemplary fee options 64 are shown on the fee detail page 50 and listed below though other fee options 64 not shown or described herein may also be included.

| | |
|---|---|
| Trigger Event | 64a |
| Frequency | 64b |
| Range Type (Count) | 64c |
| Fee Ranges For Each Range Type | 64j |
| Fees For Each Fee Range | 64k |
| Reset Period (Day, Week, Month, Year) | 64d |
| Elapse Period | 64e |
| Fee Starting Point | 64f |
| Fee Applied | 64g |
| Charge To | 64h |
| Fee Diversion | 64i |
| Fees Not Charged In Certain States | 64l |
| Fee Table Type | 64m |

In one embodiment, the Triggering Event field 64a defines an event that triggers a transaction fee, such as a card purchase, card maintenance, ATM withdrawal, ATM inquiry, etc. The frequency field 64b includes a time period for charging a fee type, such as a fee type may be charged per occurrence, per month, per year, etc. The Range Type field 64c identifies a number for a fee type that may be waived. The Fee Ranges field 64j include a selected range of transactions and the Fees for each Fee Range field 64k includes a fee to be charged for each Fee Range 64j that are processed for a card account. For example, for an ATM withdrawal fee type, the first two ATM withdrawals fees may be waived, the next three ATM withdrawal fees may be set to $2.00 and any further ATM withdrawal fees may be set to $3.00. Further, a Reset Period field 64d includes a reset period, such as daily, weekly, monthly, yearly, for the Fee Ranges field 64j. The fee options 64 may also include an Elapse Period 64e in which a number of transactions must be used and are not waived after such Elapse Period 64e even if the transactions have not exceed the selected number of transactions with a waiver of fees. A Fee Starting Point 64f or Fee Applied 64g may be defined to set a date or event to start tracking transaction fees. The Charge To field 64h defines a card account to charge fees, and the Fee Diversion field 64j may specify a different account to charge a number of fees. A Fee Table Type field 64m with preconfigured fee options 64 may be selected that includes preconfigured fee options 64 designated for an individual fee type 58 or for all the fee types.

In operation, the issuer card processing module 20 is operable to display the fee detail page 50 and receive a selection of a group of fee types 62 identified by their fee identification codes from the issuer, wherein a group of fee types 62 means at least two unique fee types. The issuer card processing module 20 is then operable to receive a selection of fee options 64 shown in the fee detail page 50 or other fee options 64 not shown in the fee detail page 50 for the selected group of fee types 62.

In one embodiment, for example, the issuer may select a group of fee types 62, and select a fee option 64 that provides for a waiver of fees for a selected number of transactions falling within the selected group of fee types. In such a case, the issuer may want to provide for no fees for the first four times any type of cash withdrawal transaction is processed. The issuer may then select a group of fee types 62 associated with cash withdrawals, such as 1022 ATM withdrawal, 1023 Teller cash, 1024 POS cash back, etc., and select waiver of fees from the fee options 64 for four transactions.

In another embodiment, the issuer card processing module 20 may receive a selection of multiple groups of fee types and selection of various fees options 64 for each group of fee types 62. As seen in FIG. 2, each group of fee types 62 is assigned a group identification 60. The issuer may select a second group of fee types 62 and different fee options 64 for the second selected group of fee types 62 in a separate fee detail page 50 displayed on the issuer card processing module 20. This second group of fee types 62 will be allocated a different group identification 60 from the first group identification.

In addition to a graphical user interface such as the fee detail page 50, in other embodiments, different data collection systems or methods may be implemented to collect issuance data 30 from the issuer, such as an interactive voice unit, call center, file transfer, etc. Using any of such data collection systems or methods, the issuer card processing module 20 is operable to receive a selection from an issuer of a group of fee types 62 and then operable to receive a selection of applicable fee options 64 for the selected group of fee types 62 from the issuer.

Once the selections are received by the issuer card processing module 20, it transmits issuance data 30 to the card processing module 12. The issuance data 30 includes fee options 64 applicable to one or more selected group of fee types 62. The issuance data may also include fee options 64 configured for any individual fee types 58 as well as issuer identification data 52 and card data 54.

FIG. 3 illustrates a schematic block diagram of one embodiment of the issuer fee program database 16 and fee records 26 in the processing system 10 in accordance with the present invention. The card processing module 12 receives issuance data 30 from the issuer card processing module 20 and then creates a fee record 26 in the issuer fee program database 16. In one embodiment, the card processing module 12 may create two types of fee records 26: a batch fee program record 26*a* and an individual fee program record 26*b*.

In one embodiment, the batch fee program record 26*a* may include issuer data 52 and card data 54. In addition, the fee record 26 includes one or more card account identifiers 70 that identify each of the card account records 28 in the card account database 18 that are to be processed according to the batch fee program record 26*a*. The card account identifier 70 may be an account number for the issued cards 36 or file pointer or other identifier such that the card processing module 12 may determine the card account records 28 associated with the batch fee program record 26*a*. The batch fee program record 26*a* also includes a fee table 72 that includes fee criteria for fee types. The fee table 72 includes group tables 74, wherein each group table 74 includes a group identification 60 for a group of fee types 62 and applicable fee options 64 for the group of fee types 62. In addition, the batch fee program record 26*a* may include individual fee tables 76, wherein each of the individual fee tables 76 include an individual fee type 58 and fee options 64 configured for the individual fee type 58.

Similarly, in one embodiment, the individual fee record 26*b* stored in the issuer fee program database 16 includes issuer data 52 and card account identifier 70. The card account identifier 70 identifies the card account record 28 in the card account database 18 that is to be processed according to the individual fee record 26*b*. The card account identifier 70 may be an account number for the issued card 36 or file pointer or other identifier such that the card processing module 12 may determine the card account record 28 associated with the individual fee record 26*b*. The individual fee record 26*b* also includes a fee table 72 that includes fee criteria for fee types. The fee table 72 includes group tables 74, wherein each group table 74 includes a group identification 60 for a group of fee types 62 and applicable fee options 64 for the group of fee types 62. In addition, the batch fee program record 26*a* may include individual fee tables 76, wherein each of the individual fee tables 76 include an individual fee type 58 and fee options 64 configured for the individual fee type 58. The fee table 72 may also include a preconfiguration table 78 that includes a fee table type 64*m* with preconfigured fee options 64 designated for an individual fee type 58 or for all fee types. Such a fee table 72 may also be included in a batch fee program record 26*a*.

The above description of the fee records 26 is exemplary, and various different records, data, fields, configurations and files may be created by the card processing module 12 to store the issuance data 30 in the issuer fee program database 16.

FIG. 4 illustrates a schematic block diagram of one embodiment of the card account database 18 shown in FIG. 1. The card processing module 12 creates a card account record 28 in the card account database 18 for each card 36 issued either individually or in a batch. Each individual card account record 28 includes cardholder data 80 received by the card processing module 12. Such cardholder data 80 may include one or more of the following, card account number 80*a*, pin numbers 80*b*, name of authorized users 80*c*, etc. In addition, the card account record 28 may include card data 54 and issuer data 52. The card account record also includes a universal fee access counter 82 for each group of fee types 62 identified by a group identification 62. The universal fee access counter 82 tracks the number of transactions associated with the card account record 28 that falls within one or more of the group of fee types 62. Thus, for the group of fee types 62 with group identification of "Group1", the universal fee access counter 82 would track the number of transactions listed in the group of fee types in Group1, such as 1031 and 1032 for example. The universal fee access counter 82 may also track other parameters with respect to the group of fee types 62 that may be needed to properly apply the selected fee options 64 for the group of fee types 62.

The above description of the card account records 28 is exemplary, and various different records, data, fields, configurations and files may be created by the card processing module 12 to store necessary cardholder data 80, card data 54 and issuer data 52 in the card account database 18.

Figure 5:
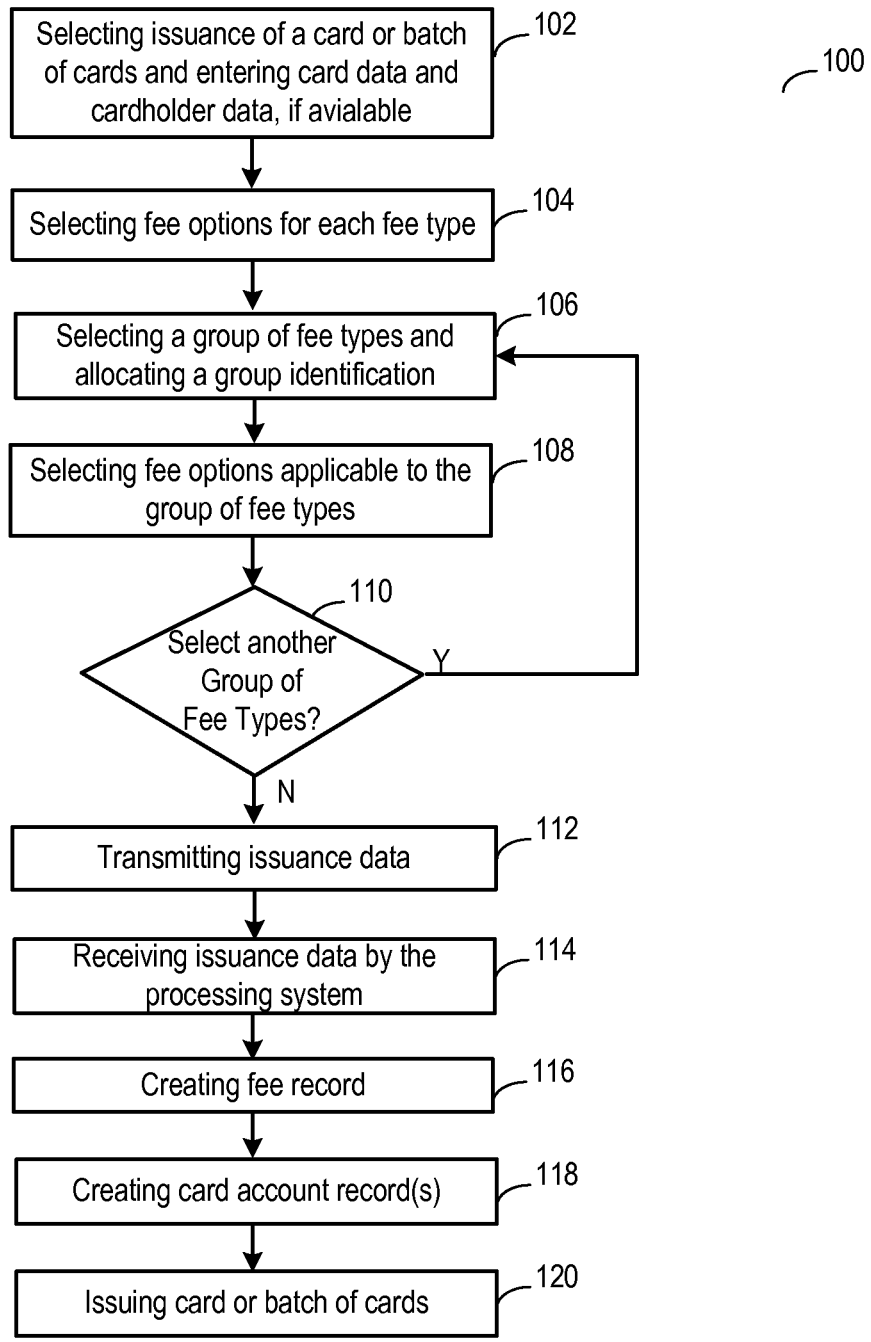
FIG. 5 is a logic diagram of an embodiment of an issuer fee program database in a processing system in accordance with the present invention.

FIG. 5 illustrates a logic diagram of one embodiment of the invention for an issuance process 100 of a card 36 or a batch of cards 36 that may be performed by the issuer card processing module 20. In step 102, the issuance process 100 includes receiving a selection for issuance of either an individual card 36 or a batch of cards 36 from an issuer and associated card data 54 for the individual card 36 or batch of cards 36. If available, cardholder data 80 is collected about the individual or entity issued a card 36 (such as name of authorized users, pins, etc.). For issuance of a batch of cards 36, the issuer selects a group of cards to be issued that are associated with a program sponsor, such as an employer, group representative, merchant or other entity. Such cards 36, for example, may be prepaid cards for activation and use by employees, customers or members of such program sponsor. Card data 54 about the program sponsor and card program identification is entered by the issuer and received by the issuer card processing module 20. If known, cardholder data 80 about the individuals, such as employees, customers or members of the program sponsor, is collected for each card 36 issued in the batch of cards 36. Some of such cardholder data 80 may also be provided at activation of the batch of cards 36. Generally, during issuance of a batch of cards 36, the same terms and conditions such as fee types and fee options are selected by the issuer for each card 36 issued in the batch.

In step 104, the issuance process 100 includes selecting or receiving a selection of fee options 64 for each unique fee type. Default settings may also be preset and automatically configured for each unique fee type during issuance if another selection is not received from the issuer during the issuance process 100. In addition, different fee table types 80 with preconfigured fee options 64 may be selected by the issuer that includes preconfigured fee options 64 for each fee type 58.

In step 106, the issuance process 100 includes selecting or receiving a selection of a group of fee types 62 by the issuer card processing module 12 and allocating a group identification 60 to the group of fee types 62. The group of fee types 62 includes two or more unique individual fee types 58. In step 108, one or more fee options 64 applicable to the group of fee types 62 are selected by the issuer and such selections are received by the issuer card processing module 12. The selection of a group of fee types 62 and applicable fee options 64 may be performed using the fee detail page 50 as shown in FIG. 2 or from another type of GUI or selection method.

For example, in one embodiment, the group of fee types 62 selected in step 106 by the issuer may include fee types associated with cash withdrawal, such as 1022 ATM withdrawal, 1023 Teller cash, 1024 POS cash back, and the one or more fee options 64 selected may include four free transactions within the group of fee types 62. In addition, another of the fee options 64 selected may be a reset period of one month. In another embodiment, one of the fee options 64 selected may include a range of fees applicable to transactions within the group of fee types, such as $1.00 for the first to fourth transactions within the group of fee types, $2.00 for the fifth to eighth transactions within the group of fee types, and $3.00 for the ninth to unlimited number of transactions. A fee option 64 of a reset period for the range of fees may also be selected in one embodiment. Additional or different one or more fee options 64 may be selected to apply to the group of fee types 62 in other embodiments of the invention.

In step 110, the issuance process 100 provides an option for selection of another group of fee types 62. The issuer card processing module 20 is operable to display another fee detail page 50 or another type of GUI or selection method for selection of a next group of fee types 62. This next group of fee types 62 is allocated a different group identification 60. Then fee options 64 may be selected for the next group of fee types 62 as described in steps 106 and 108. In step 110, when no other groups of fee types 62 need to be selected, the issuance process 100 proceeds, at step 112, to transmitting issuance data 30 for the card 36 or batch of cards 36 by the issuer card processing module 20 and receiving the issuance data by the processing system 10 through the secure card network 14 and/or through other financial or third party networks. The issuance data 30 includes cardholder data 80 if collected and entered in step 102, the card data 54 as well as the one or more groups of fee types, group identifications and applicable fee options. In addition, the issuance data 30 includes issuer data 52 (such as bank identification number or BIN, issuer location, etc) and any other information and data transmitted by the issuer card processing module 20 and supported by the processing system 10.

In step 114, the issuance process 100 includes processing the issuance data 30 by the processing system 10. In step 116, the card processing module 12 creates a fee record 26 in the issuer fee database 16 for the card 36 or batch of cards 36. As described above with respect to FIG. 3, the fee record 26 includes the group identification 60 for a group of fee types 62 and applicable fee options 64 for the group of fee types 62. In step 118, the card processing module 12 creates a card account record 28 in the card account database 18. A single card account record 28 is created for an individual issued card and a plurality of card account records 28 are created for each card 36 issued in a batch of cards 36. In step 120, the card is issued with the group of fee types 62 and applicable fee options 64 for the group of fee types 62. The processing system 10 transmits any necessary data, such as card account numbers, etc. to the issuer card processing module 12. The issuer then issues an individual card or batch of cards to the cardholders and/or the program sponsor with the group of fee types 62 and applicable fee options 64 for the group of fee types 62.

Figure 6:
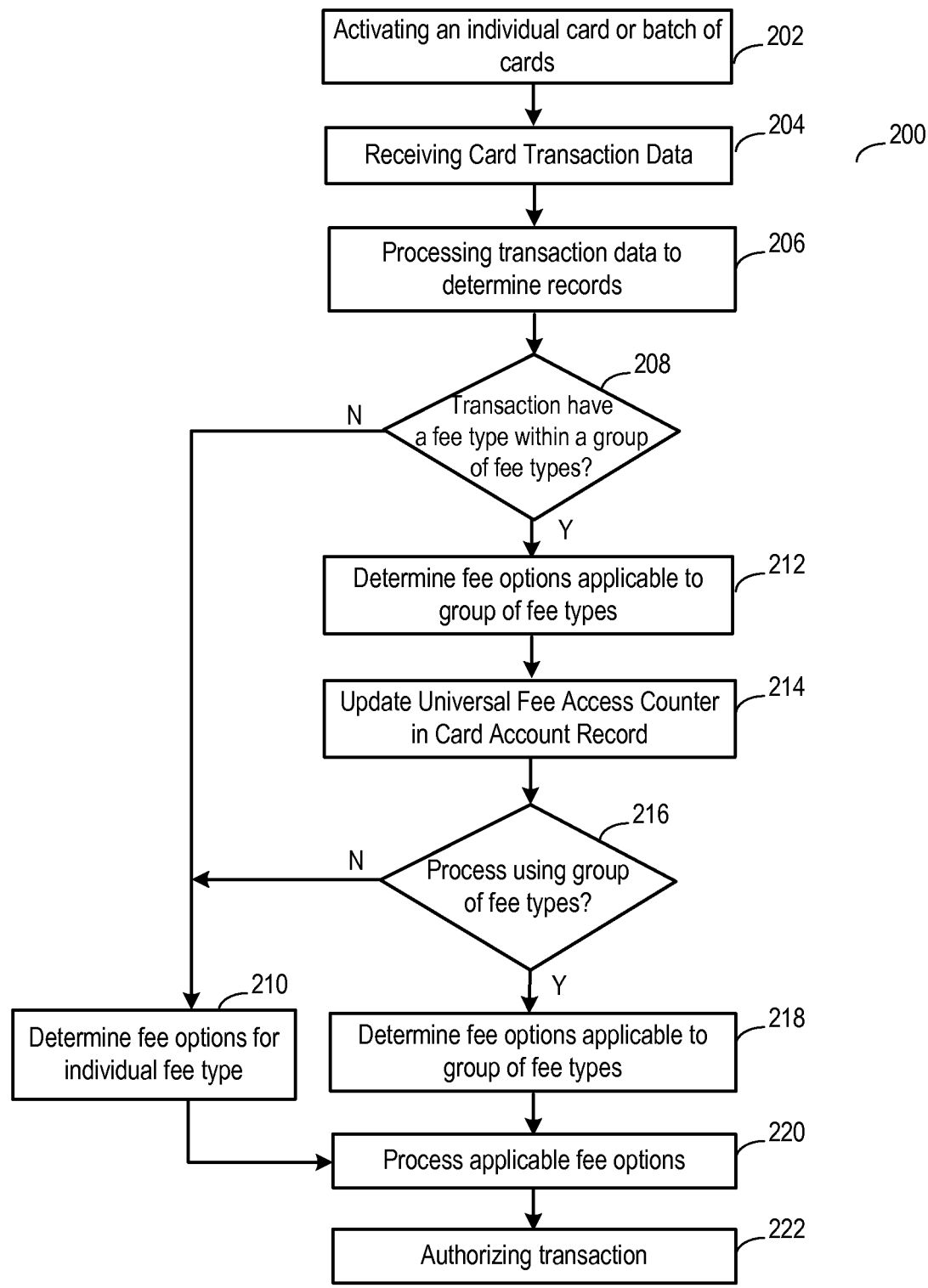
FIG. 6 is a logic diagram of an embodiment of a method for processing of card transaction fees in accordance with the present invention.

FIG. 6 is a logic diagram of one embodiment of the invention of a processing method 200 for card transaction fees. In step 202, if not done at issuance, processing method 200 includes activating an individual card 36 or batch of cards 36. Individual activation includes a cardholder transmitting activation data to the processing system 10, such as the card number and/or the PIN or other information to be associated with the card 36. Instead of the cardholder activating the card 36, it is also possible for an issuer to activate the card 36 on the card user's behalf. In batch activation by an issuer, the issuer card processing module 20 receives from the issuer or program sponsor activation data and transmits the activation data to the processing system 10. The activation data may include the card number and/or the PIN or other information to be associated with each card in the batch. The program sponsor then may distribute the cards 36 to the designated cardholders. Activation of a card 36 by the processing system 10 may include updating a field or parameter or setting up the card account record 28 in the card account database 18. Once activated, transactions associated with the card 36 may be authorized.

In step 204, the processing method 200 includes receiving card transaction data 32 by the card processing module 12 for a transaction associated with the card 36. The card transaction data 32 includes transaction data which may include for example, type of transaction, amount of transaction, merchant identification and other information relating to the particular transaction. In addition, during a transaction, a merchant collects card information from a magnetic stripe or chip of the card 36 using the merchant card processing module 24. In general, the card information on the magnetic strip or chip of a card 36 includes card data 54 and/or cardholder data 80, such as the Bank Identification Number or BIN which is a sequence of digits that identifies the issuer, the card account number and a validity check code. In addition, issue and expiration dates, as well as extra codes such as issue numbers and security codes, may be included in the card information on the magnetic strip or chip of a card 36. Alternatively, the needed card information, including card data 54 and/or cardholder data 80, may be collected by the merchant using other methods, such as using a secure merchant payment web portal on a public network, such as the internet. The card information printed on the card 36, such as the BIN, individual account number, security code expiration date, etc. may be collected by a merchant through the merchant payment GUI. The card transaction data 32 includes this collected card information, such as the card data 54 and/or cardholder data 80, as well as the transaction data.

The merchant card processing module 24 and/or merchant network transmits the card transaction data 32 for authorization of the transaction to the acquirer card processing module 22. The acquirer card processing module 22 may format the card transaction data 32 into an authorization request message 34 and transmit the authorization request message 34 to the card processing module 12 over the secure card network 14. The card transaction data 32 may alternatively be transmitted by the merchant card processing module 24 to the secure card network 14 and/or through other third party processing networks or financial networks rather than through the acquirer.

In step 206, the card processing module 12 processes the card transaction data 32 to determine the fee record 26 associated with the card 36 and the card account record 28 associated with the card 36. Using the transaction data 32 and the fee record 26, the processing module 12 then determines in step 208 whether the transaction has an associated fee type within a group of fee types 62 in the fee record 26. When the transaction does not have an associated fee type within a group of fee types 62 in the fee record 26, the processing method 100 continues in step 210 by determining from the fee record 26 the default or preconfigured fee options 64 for the individual fee type 58 associated with the transaction. The fee record 26 may include an individual fee table 76 which includes the individual fee type 58 and fee options 64 configured for the individual fee type 58. The fee record 26 may also include a pre-configuration table 78 that includes a fee table type 64$m$ with preconfigured fee options 64 designated for the individual fee type 58.

When the transaction does have an associated fee type within a group of fee types 62, in step 212 the card processing module 12 determines the group identification 60 and fee options 64 applicable for the group of fee types 62 from the fee record 26. In step 214, the card processing module 12 then accesses the card account record 28 from the card account database 18 and updates the universal fee access counter 82 that is associated with the group identification 60 with the new card transaction data 32. In step 216, the card processing module 12 then determines if the transaction should be processed using the fee options 64 applicable to the group of fee types 62. The card processing module 12 must determine whether the transaction is within a parameter tracked by the universal access counter 82, such as the designated number of transactions, reset period, fee range, origination, time period, triggering event, etc., or other parameters tracked by the universal fee access counter 82.

For example, the group of fee types may include cash withdrawal such as 1022 ATM withdrawal, 1023 Teller cash, 1024 POS cash back, and the fee options may include four free transactions within the group of fee types. When the transaction data indicates that it is a "1022 ATM withdrawal", the card processing module 12 would update the universal fee access counter 82 by one more transaction. When the universal fee access counter is four or below, then the card processing module 12 does not charge the card account for the fee associated with the "1022 ATM withdrawal". When the universal fee access counter is above four, then the processing method continues to step 210 to determine the default fee option for the fee type of "1022 ATM withdrawal", such as $1.00 fee. In addition, one of the fee options may be a reset period of one month. So the card processing module 12 would also determine whether the one month reset period has occurred and if so, reset the universal fee access counter 82 before determining if the transaction is within the parameters of the universal fee access counter 82 for applying the fee options 64 applicable to the group of fee types 62. In another embodiment, the fee options may include a range of fees applicable to transactions within the group of fee types, such as $1.00 for the first to fourth transactions within the group of fee types, $2.00 for the fifth to eighth transactions within the group of fee types, and $3.00 for the ninth to unlimited number of transactions. In this embodiment, the card processing module 12 would determine from the universal fee access counter 82 the number of transactions within the group of fee types 62 and the amount of the transaction fees for that number of transaction within the range of fees. One or more parameters for the fee options 64 applicable to the group of fee types 62 are thus tracked by the universal fee access counter 82.

When the card processing module 12 determines that the transaction should not be processed using the fee options 64 applicable to the group of fee types 62, then the processing method 100 proceeds to step 210 and determines the default or preconfigured fees according to the fee options 64 for that individual fee type 58 associated with the transaction. When the card processing module 12 determines that the transaction should be processed using the fee options 64 applicable to the group of fee types 62, then the processing method 100 proceeds to step 218, and the card processing module 12 determines the fee options applicable to the group of fee types 62. In step 220 of the processing method 200, the fee options 64 determined to be applicable to the transaction in either step 210 or 218 are processed.

The card processing module 12 then continues with an authorization of the transaction in step 222. The authorization of the transaction in step 222 includes comparing the cardholder data 80 received with the cardholder data 80 in the card account record 28. When no fraud is detected by the card processing network 10, then the card processing module 12 may then transmit an authorization request to the issuer processing module 20 with the card transaction data and transaction fees for review by the issuer over the secure card network 14 and/or through the issuer network or other third party network. The issuer processing module 20 transmits an authorization response either approving or denying the transaction. The card processing module 12 then transmits the approval or denial with any response information to the acquirer processing module 22 for delivery to the merchant card processing module 24. In another embodiment, the card processing module 12 may transmit the approval or denial with any response information to the merchant card processing module 24 without first sending to the message to the acquirer processing module 22. In another embodiment, the card processing module 12 may authorize or deny the transaction without review by the issuer processing module 20.

In one particular embodiment, the processing system 10 supports issuance and processing of transactions for a prepaid card configured with fee options that include a waiver of fees for a selected number of a group of fee types applicable to cash withdrawals. A prepaid card includes but is not limited to, for example, bank cards, prepaid, preloaded or prefunded cards, such as general purpose reloadable cards, travel cards, payroll cards, teen or student cards, commercial cards, gift cards, or any other type of preloaded, prefunded or prepaid conventional payment card or account, in any type of physical or electronic form, including a plastic card, smart card, microchip, wireless device, electronic fund account, etc.

A program sponsor, such as an employer or other entity or individual funds the prepaid card that is issued by the issuer. For example, one example of a prepaid card is a payroll card. The employer is the program sponsor and payroll cards provide an alternative to direct deposit, paychecks or cash to underbanked or non-banked employees. Prepaid cards may also be established to provide government granted benefits, including but not limited to social security benefits, disability payments, Medicare/Medicaid, and welfare payments. In this instance, the program sponsor would refer to a government agency responsible for funding the prepaid cards. Another example, prepaid cards may be used as gift cards for purchases from a particular merchant who acts as the program sponsor.

Figure 7:
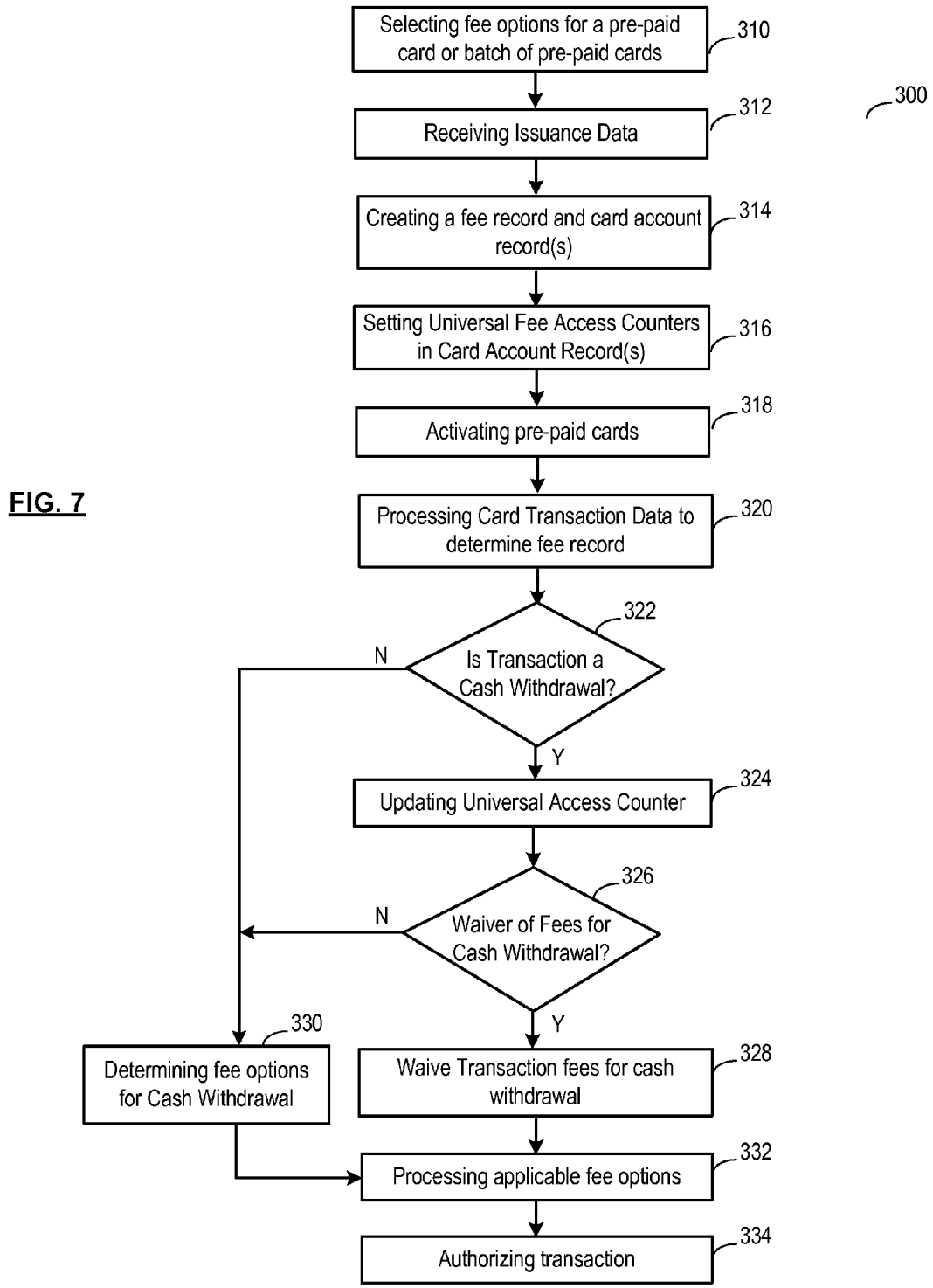
FIG. 7 is a logic diagram of an embodiment for a method for processing prepaid cards in accordance with the present invention.

FIG. 7 illustrates a logic diagram of an embodiment of a method for issuance and processing of prepaid cards 300 to include free transactions for a selected number of a group of fee types in accordance with the present invention. In step 310, fee options for a group of fee types 62 is selected for a prepaid card or a batch of prepaid cards. In this embodiment, the group of fee types 62 includes fee types associated with cash withdrawals, such as ATM withdrawals, fund transfers, POS Cash Back, etc. The fee options 64 selected for the group of fee types 62 includes a range count of a waiver of fees for a certain number of transactions. In addition, the fee options 64 may include a reset period, e.g. the number of transactions with a waiver of fees may be reset at the end of the reset period, such as at each pay period for an employee payroll card. The options 64 may also include an elapse period in which the number of transactions must be used and are not waived after such elapse period even if the transactions performed in the group of fee types have not exceed the selected number of transactions with a waiver of fees. Other fee options 64 may also be configured for the group of fee types 62 for the prepaid card. The processing system 10 then receives the issuance data 30 including the fee options 64 for the group of fee types 62 in step 312.

In step 314 of the process 300, the card processing module 12 in the processing system 10 creates either a batch fee program record 26a for issuance of a batch of prepaid cards or an individual card fee record 26b for issuance of an individual card in the issuer fee program database 16. The fee record 26 includes the fee options 64 selected for the group of fee types 62 associated with cash withdrawals. The card processing module 12 also creates a card account record 28 for each issued card. In step 316, the Universal Fee Access Counter 82 in each of the fee records 26 is set for the selected number of free cash withdrawals desired for the group of fee types 62. In step 318, the batch of prepaid cards or individual prepaid card is activated.

In step 320, the card processing module 12 receives card transaction data 32 and processes the card transaction data 32 to determine the fee record 26 associated with the card transaction data 32. In step 322, the card processing module 12 determines whether the fee type is included in a selected group of fee types 62 in the fee record 26. In this embodiment, the group of fee types 62 includes fee types associated with cash withdrawals. As such, the card processing module 12 in step 322 determines whether the fee type is a cash withdrawal listed in the group of fee types 62.

When the fee type is a cash withdrawal listed in the group of fee types 62, the card processing module 12 updates the universal fee access counter 82 that is associated with the group identification 60 with the new transaction in step 324. In step 326, the card processing module 12 determines whether Universal Fee Access Counter 82 has exceeded its preset number, e.g. if the number of free cash withdrawals in the group of fee types associated with cash withdrawals has been exceeded. When the Universal Fee Access Counter 82 has exceeded its preset number, the transaction fee for the fee type is waived during processing of the applicable fees in step 328.

When the universal fee access counter 82 has been exceeded or the elapse period has elapsed for providing free transactions in the group of fee types 62, or other fee options 64 configured for the group of fee types 62 associated with cash withdrawals has not been met, then the transaction is processed based on the preconfigured or default fee options 64 for the individual fee type 58, as shown in step 330. However, if that fee type was originally preconfigured in a fee table type or default setting to waive fees for one or more transactions with that fee type, then the cardholder may be receiving more than the desired number of transactions at no cost. Thus, the pre-configuration of fee options 64 for any individual fee types 58 in a group of fee types 62 needs to be considered and changed or reallocated during issuance to ensure only the desired number of free transactions are allowed during processing of the applicable fees in step 332. In step 334, authorization of the transaction is performed.

The above embodiments of the processing system and method of the present invention provides for more flexible fee allocations of cards. A group of fee types may be selected and fee options applied to the group of fee types. A Universal Fee Access Counter in a card account record tracks the number of transactions or other parameters associated with fee options selected for the group of fee types. This flexibility provides increased fee options to be offered to issuers by the processing system.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may still further be used herein, the term "associated with", includes direct and/or indirect association of separate data and/or one data being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A method comprising:
   receiving, from an issuer, a first identification code for a first fee type;
   receiving, from the issuer, a second identification code for a second fee type;
   grouping, using at least one processor operatively coupled with a memory, the first and second fee types into a group of fee types using the first and second identification codes;
   receiving a selection of one or more fee options applicable to the group of fee types;
   determining a batch of account identifiers to which to apply the selection of the one or more fee options;
   transmitting the selection of the one or more fee options with the account identifiers to a card processing module of a card processing system that issues one or more respective accounts in accordance with the selection of the one or more fee options;
   receiving a preset number for a universal fee access counter;
   creating a fee record associated with the account identifiers in an issuer fee database, wherein the fee record includes the one or more fee options applicable to the group of fee types;
   creating an account record associated with one of the account identifiers in an account database, wherein the account record includes the universal fee access counter;
   receiving transaction data for a transaction in an authorization request message;
   determining whether the transaction has a fee type within the group of fee types;

receiving an indication that the transaction is within the group of fee types;

incrementing the universal fee access counter in response to the indication;

determining an amount of transaction fees for the transaction based on the universal fee access counter; and applying the determined amount of transaction fees to the transaction and transmitting an authorization response in response to the authorization request message.

2. The method of claim 1, wherein the one or more fee options includes a fee for an event selected from the group consisting of a voice response unit (VRU) access, a certificate signing request (CSR) access, an automated teller machine (ATM) balance inquiry, an ATM withdrawal, cash from a teller, a purchase with cash back, a signature for quasi cash, using a personal identification number (PIN) for a purchase, using a PIN for quasi cash, using a signature for a purchase, a PIN declined, a signature declined, and an automated clearing house (ACH) funds transfer.

3. The method of claim 1, wherein receiving the selection of the one or more fee options includes using a graphical user interface displayed on an issuer card processing module.

4. The method of claim 1 wherein the one or more fee options includes a waiver of fees for the group of fee types.

5. A method comprising:

receiving, from an issuer, a first identification code for a first fee type;

receiving, from the issuer, a second identification code for a second fee type;

receiving, from the issuer, a third identification code for a third fee type;

receiving, from the issuer, a fourth identification code for a fourth fee type;

grouping, using at least one processor operatively coupled with a memory, the first and second fee types into a first group of fee types using the first and second identification codes;

grouping the third and fourth fee types into a second group of fee types using the third and fourth identification codes;

receiving a selection of one or more fee options applicable to the first group of fee types;

receiving a selection of one or more fee options applicable to the second group of fee types;

determining a batch of account identifiers to which to apply the selections of the one or more fee options;

transmitting the selections of the one or more fee options with the account identifiers to a card processing module of a card processing system that issues one or more respective accounts in accordance with the selections of the one or more fee options;

receiving a preset number for a universal fee access counter;

creating a fee record associated with the account identifiers in an issuer fee database, wherein the fee record includes the one or more fee options applicable to the first and second groups of fee types;

creating an account record associated with the account identifiers in an account database, wherein the account record includes the universal fee access counter;

receiving transaction data for a transaction in an authorization request message for a first account of the one or more respective accounts;

determining whether the transaction has a fee type within the first group of fee types;

updating the universal fee access counter based on a determination that the transaction has a fee type within the first group of fee types;

determining an amount of transaction fees for the transaction based on the universal fee access counter; and applying the determined amount of transaction fees to the transaction and transmitting an authorization response in response to the authorization request message, wherein creating the account record includes the universal fee access counter for tracking parameters associated with the one or more fee options applicable to the first group and the second group of fee types.

6. A method comprising:

receiving, from an issuer, a first identification code for a first fee type;

receiving, from the issuer, a second identification code for a second fee type;

grouping, using at least one processor operatively coupled with a memory, the first and second fee types into a group of fee types using the first and second identification codes;

receiving a selection of one or more fee options applicable to the group of fee types;

determining a batch of account identifiers to which to apply the selection of the one or more fee options;

transmitting the selection of the one or more fee options with the account identifiers to a card processing module of a card processing system that issues one or more respective accounts in accordance with the selection of the one or more fee options;

receiving a preset number for a universal fee access counter;

creating a fee record associated with the account identifiers in an issuer fee database, wherein the fee record includes the one or more fee options applicable to the group of fee types;

creating an account record associated with one of the account identifiers in an account database, wherein the account record includes the universal fee access counter for tracking parameters associated with the one or more fee options applicable to the group of fee types;

receiving transaction data for a transaction in an authorization request message for a first account of the one or more respective accounts;

determining whether the transaction has a fee type within the group of fee types;

updating the universal fee access counter based on a determination that the transaction has a fee type within the group of fee types;

determining an amount of transaction fees for the transaction based on the universal fee access counter;

applying the determined amount of transaction fees to the transaction and transmitting an authorization response in response to the authorization request message; and receiving issuance data for a batch of cards, wherein the issuance data includes a group of fee types and one or more fee options applicable to the account record.

7. The method of claim 6, wherein the fee record includes the one or more fee options applicable to the group of fee types.

8. The method of claim 7, wherein the fee record includes the universal fee access counter for tracking parameters associated with the one or more fee options applicable to the group of fee types.

9. A processing system comprising:

one or more processing devices;

a memory element operatively coupled with the one or more processing devices, the one or more processing devices executing instructions comprising:

program code for receiving, from an issuer, a first identification code for a first fee type;

program code for receiving, from the issuer, a second identification code for a second fee type;

program code for grouping the first and second fee types into a group of fee types using the first and second identification codes;

program code for receiving a selection of one or more fee options applicable to the group of fee types;

program code for determining a batch of account identifiers to which to apply the selection of the one or more fee options;

program code for transmitting the selection of the one or more fee options with the account identifiers to a card processing module of a card processing system that issues one or more respective accounts in accordance with the selection of the one or more fee options;

program code for receiving a preset number for a universal fee access counter;

program code for creating a fee record associated with the account identifiers in an issuer fee database, wherein the fee record includes the one or more fee options applicable to the group of fee types;

program code for creating an account record associated with one of the account identifiers in an account database, wherein the account record includes the universal fee access counter;

program code for receiving transaction data for a transaction in an authorization request message;

program code for determining whether the transaction has a fee type within the group of fee types;

program code for receiving an indication that the transaction is within the group of fee types;

program code for incrementing the universal fee access counter in response to the indication;

program code for determining an amount of transaction fees for the transaction based on the universal fee access counter; and program code for applying the determined amount of transaction fees to the transaction and transmitting an authorization response in response to the authorization request message.

10. The system of claim 9, wherein the one or more fee options includes a fee for an event selected from the group consisting of a voice response unit (VRU) access, a certificate signing request (CSR) access, an automated teller machine (ATM) balance inquiry, an ATM withdrawal, cash from a teller, a purchase with cash back, a signature for quasi cash, using a personal identification number (PIN) for a purchase, using a PIN for quasi cash, using a signature for a purchase, a PIN declined, a signature declined, and an automated clearing house (ACH) funds transfer.

11. The system of claim 9, wherein the one or more processing devices executes instructions further comprising:

program code for allocating a group identification to the group of fee types.

12. The system of claim 9, wherein receiving the first and second identification codes for the first and second fee types includes using a graphical user interface displayed on an issuer card processing module.

13. The system of claim 9, wherein receiving the selection of the one or more fee options includes using a graphical user interface displayed on an issuer card processing module.

14. The system of claim 9 wherein the one or more fee options includes a waiver of fees for the selection of the group of fee types.

15. The system of claim 9, wherein the one or more processing devices executes instructions further comprising:

program code for creating a fee record associated with the at least one of the account identifiers in an issuer fee database, wherein the fee record includes the one or more fee options applicable to the group of fee types; and program code for creating an account record associated with one of the account identifiers in an account database, wherein the account record includes the universal fee access counter for tracking parameters associated with the one or more fee options applicable to the group of fee types.

16. The method of claim 1, further comprising:

determining whether the universal fee counter exceeds a threshold; and charging a fee associated with the group of fee types to the account record.

17. A processing system comprising:

one or more processing devices;

a memory element operatively coupled with the one or more processing devices, the one or more processing devices executing instructions from the memory element comprising:

program code for receiving, from an issuer, a first identification code for a first fee type;

program code for receiving, from the issuer, a second identification code for a second fee type;

program code for receiving, from the issuer, a third identification code for a third fee type;

program code for receiving, from the issuer, a fourth identification code for a fourth fee type;

program code for grouping, using at least one processor operatively coupled with a memory, the first and second fee types into a first group of fee types using the first and second identification codes;

program code for grouping the third and fourth fee types into a second group of fee types using the third and fourth identification codes;

program code for receiving a selection of one or more fee options applicable to the first group of fee types;

program code for receiving a selection of one or more fee options applicable to the second group of fee types, program code for determining a batch of account identifiers to which to apply the selections of one or more fee options;

program code for transmitting the selections of the one or more fee options with the account identifiers to a card processing module of a card processing system that issues one or more respective accounts in accordance with the selections of the one or more fee options;

program code for receiving a preset number for a universal fee access counter;

program code for creating a fee record associated with the account identifiers in an issuer fee database, wherein the fee record includes the one or more fee options applicable to the first and second groups of fee types;

program code for creating an account record associated with one of the account identifiers in an account database, wherein the account record includes the universal fee access counter;

program code for receiving transaction data for a transaction in an authorization request message for a first account of the one or more respective accounts;
program code for determining whether the transaction has a fee type within the first group of fee types;
program code for updating the universal fee access counter based on a determination that the transaction has a fee type within the first group of fee types;
program code for determining an amount of transaction fees for the transaction based on the universal fee access counter; and
program code for applying the determined amount of transaction fees to the transaction and transmitting an authorization response in response to the authorization request message,
wherein creating the account record includes the universal fee access counter for tracking parameters associated with the one or more fee options applicable to the first group and the second group of fee types.

18. The system of claim 17, wherein the one or more fee options applicable to the first group and the second group of fee types includes a fee for an event selected from the group consisting of a voice response unit (VRU) access, a certificate signing request (CSR) access, an automated teller machine (ATM) balance inquiry, an ATM withdrawal, cash from a teller, a purchase with cash back, a signature for quasi cash, using a personal identification number (PIN) for a purchase, using a PIN for quasi cash, using a signature for a purchase, a PIN declined, a signature declined, and an automated clearing house (ACH) funds transfer.

19. The system of claim 17, wherein receiving the selection of the one or more fee options includes using a graphical user interface displayed on an issuer card processing module.

20. The system of claim 17, wherein the one or more fee options applicable to the first group and the second group of fee types includes a waiver of fees for the selection of the first group of fee types.

21. A processing system comprising:
one or more processing devices;
a memory element operatively coupled with the one or more processing devices, the one or more processing devices executing instructions from the memory element comprising:
program code for receiving, from an issuer, a first identification code for a first fee type;
program code for receiving, from the issuer, a second identification code for a second fee type;
program code for grouping, using at least one processor operatively coupled with a memory, the first and second fee types into a group of fee types using the first and second identification codes;
program code for receiving a selection of one or more fee options applicable to the group of fee types;
program code for determining a batch of account identifiers to which to apply the selection of the one or more fee options;
program code for transmitting the selection of the one or more fee options with the account identifiers to a card processing module of a card processing system that issues one or more respective accounts in accordance with the selection of the one or more fee options;
program code for receiving a preset number for a universal fee access counter;
program code for creating a fee record associated with the at least one of the account identifiers in an issuer fee database, wherein the fee record includes the one or more fee options applicable to the group of fee types;
program code for creating an account record associated with one of the account identifiers in an account database, wherein the account record includes the universal fee access counter for tracking parameters associated with the one or more fee options applicable to the group of fee types;
program code for receiving transaction data for a transaction in an authorization request message for a first account of the one or more respective accounts;
program code for determining whether the transaction has a fee type within the group of fee types;
program code for updating the universal fee access counter based on a determination that the transaction has a fee type within the group of fee types;
program code for determining an amount of transaction fees for the transaction based on the universal fee access counter;
program code for applying the determined amount of transaction fees to the transaction and transmitting an authorization response in response to the authorization request message; and
program code for receiving issuance data for a batch of cards, wherein the issuance data includes a group of fee types and one or more fee options applicable to the account record.

22. The system of claim 21, wherein the one or more fee options applicable to the group of fee types includes a fee for an event selected from the group consisting of a voice response unit (VRU) access, a certificate signing request (CSR) access, an automated teller machine (ATM) balance inquiry, an ATM withdrawal, cash from a teller, a purchase with cash back, a signature for quasi cash, using a personal identification number (PIN) for a purchase, using a PIN for quasi cash, using a signature for a purchase, a PIN declined, a signature declined, and an automated clearing house (ACH) funds transfer.

23. The system of claim 21, wherein receiving the selection of the one or more fee options includes using a graphical user interface displayed on an issuer card processing module.

24. The system of claim 21, wherein the one or more fee options includes a waiver of fees for the selection of the group of fee types.

* * * * *